(12) United States Patent
Takeda et al.

(10) Patent No.: US 7,449,160 B2
(45) Date of Patent: Nov. 11, 2008

(54) PROCESS OF SOLVENT EXTRACTION OF COPPER

(75) Inventors: Kenji Takeda, Niihama (JP); Kouji Ando, Niihama (JP); Keiji Kudo, Niihama (JP); Masaki Imamura, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 594 days.

(21) Appl. No.: 10/529,176

(22) PCT Filed: May 13, 2004

(86) PCT No.: PCT/JP2004/006456

§ 371 (c)(1),
(2), (4) Date: Mar. 24, 2005

(87) PCT Pub. No.: WO2005/103308

PCT Pub. Date: Nov. 3, 2005

(65) Prior Publication Data

US 2006/0147360 A1   Jul. 6, 2006

(30) Foreign Application Priority Data

Apr. 20, 2004   (JP) ............................... 2004-123767

(51) Int. Cl.
*B01D 11/04* (2006.01)
*C22B 15/00* (2006.01)
*C22B 15/14* (2006.01)

(52) U.S. Cl. .......................... 423/24; 423/139; 423/493; 75/743

(58) Field of Classification Search .................... 423/24, 423/139, 493; 75/743
See application file for complete search history.

(56) References Cited

U.S. PATENT DOCUMENTS

| 4,337,128 | A | * | 6/1982 | Haakonsen et al. | .......... 205/582 |
| 2004/0144208 | A1 | * | 7/2004 | Ando et al. | .................... 75/743 |

FOREIGN PATENT DOCUMENTS

| JP | 6-240373 | 8/1994 |
| JP | 8-176693 | 7/1996 |

* cited by examiner

*Primary Examiner*—Ngoc-Yen M Nguyen
(74) *Attorney, Agent, or Firm*—Edwards Angell Palmer & Dodge LLP

(57) ABSTRACT

A process for efficient separation/recovery of copper involving selective extraction of the copper ion with the aid of an organic extractant from an aqueous chloride solution containing copper and one or more concomitant elements, discharged from an extractive metallurgy of non-ferrous metals or the like, and subsequent stripping. The process of solvent extraction of copper which treats an aqueous chloride solution containing copper and one or more concomitant elements to separate/recover copper, comprising the first step for selective extraction of copper from the aqueous chloride solution by mixing the solution with an extractant of organic solvent composed of tributyl phosphate as the major component after adjusting the solution at an oxidation-reduction potential of 0 to 350 mV (based on an Ag/AgCl electrode), and the second step for stripping of copper by mixing the extractant in which copper is stripped with an aqueous solution.

8 Claims, 5 Drawing Sheets

PROCESS OF SOLVENT EXTRACTION OF COPPER

BACKGROUND OF THE INVENTION

1. Field of the Invention

The present invention relates to a process of solvent extraction of copper, more particularly to a process for efficient separation/recovery of copper involving selective extraction of the copper ion with the aid of an organic extractant from an aqueous chloride solution containing copper and one or more concomitant elements, discharged from an extractive metallurgy of non-ferrous metals or the like, and subsequent stripping, and also to a process of solvent extraction which can keep a high extraction yield of copper even when an extractant discharged from the stripping step is recycled.

2. Description of the Prior Art

Techniques for separation of copper from various concomitant elements are important challenges for an extractive metallurgy of non-ferrous metals, and treatment of copper-containing by-products from an extractive metallurgy of steel and metal-containing wastes, in order to improve yield and quality of copper and purity of iron, among others. One of the commonly used processes involves oxidation of iron and removal of the resulting precipitates, when copper, iron or the like are concomitantly present in a solution. However, the precipitate of iron hydroxide is generally low in purity, because of high moisture content and presence of one or more concomitant elements in addition to copper. Therefore, the precipitate is discarded in many cases, because of the limited applicable areas. As a result, coprecipitated copper is also discarded, leading to copper loss.

The effective solutions to these problems is a process of solvent extraction with an organic solvent as an extractant capable of concentrating the element present in a solution at a low concentration and separating the element from other elements on an industrial scale.

The representative solvent extraction processes for separating copper from iron include the followings.

One process is extraction of copper with an acid extractant (e.g., LIX64™) to treat a leach liquor from leaching of copper oxide ore partly containing a copper sulfide mineral with a sulfuric acid solution. Another process proposed so far is extraction of the copper ion with an extractant (e.g., LIX54™) to treat a leach liquor containing ammine from treatment of wastes of automobiles, home electric/electronic appliances or the like (disclosed by, e.g., JP-A 06-240373 (Pages 1 and 2)).

Extraction with an acid extractant generally needs a neutralizing agent, e.g., sodium hydroxide or ammonia, to keep the solution at pH 1.5 to 2.5, because the solution pH level decreases as copper is extracted. This causes problems of an accumulated neutralizing agent component in the leach liquor. Moreover, stripping of copper from an organic solvent discharged from an extraction step should be carried out in a strongly acidic region. Therefore, extraction and stripping of a leach liquor in which copper, iron or the like is leached in a strongly acidic region involve problems of massive acid and alkali consumption.

On the other hand, a solvating extractant, e.g., tributyl phosphate (TBP) or trioctyl phosphine oxide (TOPO), which has been used for separation of the iron ion, needs little acid or alkali in extraction and stripping for an aqueous chloride solution, because it can extract a metallic ion irrespective of solution pH level. However, a solvating extractant little works for extraction of the cupric ion. Therefore, solvent extraction applied to an aqueous chloride solution containing the cupric, ferrous and ferric ions with a solvating extractant can separate copper and iron from each other by extracting the ferric ion into the extract while leaving the cupric ion in the raffinate. However, the ferrous ion, when present, makes iron extraction unstable and should be oxidized beforehand into the ferric ion.

A process for extracting the cuprous ion with a solvating extractant is proposed to separate/recover copper from leach product liquor concomitantly containing nickel and cobalt discharged a chlorine-aided leaching, where the copper ion is reduced to the monovalent state prior to extraction (disclosed by, e.g., JP-A 08-176693 (Page 2)). This can separate the cuprous ion from nickel and cobalt by extraction. However, this document is silent on separation of copper from iron, when the latter is present in the liquor.

Recently, electrowinning of copper from an aqueous chloride solution has been attracting attention for hydrometallurgical process of a copper sulfide mineral. This is because the cuprous ion can be stably present in an aqueous chloride solution, unlike in a sulfuric acid solution. Therefore, electrolysis of a feed solution containing the cuprous ion brings an effect of halving power consumption from that for normal electrolysis of the cupric ion. An electrolysis feed is preferably an aqueous solution containing the cuprous chloride ion, but free of impurity elements, e.g., iron.

Moreover, a usual extraction process by TBP for an aqueous chloride solution concomitantly containing the silver ion needs an additional step of separating copper and silver from each other, because the silver ion cannot be extracted by TBP, as is the case with the cupric ion. Separation of silver and copper present in an aqueous chloride solution from each other is not easy, because of their chemical properties, and is generally carried out by an amalgam process with mercury. This causes problems related to environmental protection and economic efficiency, resulting from massive use of mercury. Another process removes silver in the form of precipitate by neutralization and sulfidation. This, however, also precipitates copper to deteriorate copper separation efficiency.

As discussed above, it is difficult to selectively separate copper from iron present in an aqueous chloride solution by extraction with an acid extractant without massively consuming an acid and alkali. Use of a solvating extractant, on the other hand, also involves problems, e.g., massive energy consumption, when electrowinning or the like is adopted to recover copper and iron by reduction from the respective iron and copper solutions as the extraction product liquors, the former containing the cupric ion while the latter ferric ion, even when a solvating extractant is used.

Under these circumstances, there are demands for solvent extraction processes which treat an aqueous chloride solution containing one or more elements in addition to copper by extraction with an organic extractant and subsequent stripping to separate/recover copper from the concomitant elements efficiently on an industrial scale, and also for processes which efficiently separate the copper and silver ions from each other.

In this specification, oxidation-reduction potential is that at 20° C., based on an Ag/AgCl electrode.

SUMMARY OF THE INVENTION

It is an object of the present invention to provide a process for efficient separation/recovery of copper involving selective extraction of the copper ion with the aid of an organic extractant from an aqueous chloride solution containing copper and one or more concomitant elements, discharged from an extractive metallurgy of non-ferrous metals or the like, and subsequent stripping, in consideration of the above problems involved in conventional techniques. It is another object to provide a process of solvent extraction which can keep a high extraction yield of copper even when an extractant discharged from the stripping step is recycled.

The inventors of the present invention have found, after having extensively studied processes of solvent extraction of copper, that copper can be efficiently separated from one or more concomitant elements and recovered by treating an aqueous chloride solution with an organic extractant composed of TBP as the major component after adjusting the solution at an oxidation-reduction potential in a specific range, and that stripping yield can be kept at a high level by adjusting TBP in the extractant at a specific concentration, achieving the present invention.

The first aspect of the present invention is a process of solvent extraction of copper which treats an aqueous chloride solution containing copper and one or more concomitant elements to separate/recover copper, comprising:

the first step for selective extraction of copper from the aqueous chloride solution by mixing the solution with an extractant of organic solvent composed of tributyl phosphate as the major component after adjusting the solution at an oxidation-reduction potential of 0 to 350 mV (based on an Ag/AgCl electrode), and the second step for stripping of copper by mixing the extractant in which copper is stripped with an aqueous solution.

The second aspect of the present invention is the process of solvent extraction of copper of the first aspect, wherein the aqueous chloride solution for the first step is kept at an oxidation-reduction potential of 250 to 300 mV (based on an Ag/AgCl electrode).

The third aspect of the present invention is the process of solvent extraction of copper of the first aspect, wherein the extractant for the first step contains tributyl phosphate at 40% by volume or more.

The fourth aspect of the present invention is the process of solvent extraction of copper of the third aspect, wherein the extractant for the first step contains tributyl phosphate at 80 to 90% by volume.

The fifth aspect of the present invention is the process of solvent extraction of copper of the first aspect, wherein the aqueous solution for the second step contains copper at 70 g/L or less and the chlorine ion at 50 to 350 g/L.

The sixth aspect of the present invention is the process of solvent extraction of copper of the first aspect, wherein the stripping is carried out at 20 to 90° C. in the second step.

The seventh aspect of the present invention is the process of solvent extraction of copper of one of the first to sixth aspects, wherein the concomitant elements are iron and/or silver.

The process of solvent extraction of copper of the present invention can efficiently separate/recover the copper ion from an aqueous chloride solution containing copper and one or more concomitant elements, discharged from an extractive metallurgy of non-ferrous metals or the like, by selective extraction and subsequent stripping, and as such is of very high industrial value as a process for producing a electrolysis feed containing the cuprous ion for electrowinning. Adjusting TBP concentration at a given level is preferable, because this can keep extraction yield of copper at a high level even when the extractant discharged from the stripping step is recycled, and hence is more advantageous.

NOTATION

Figure 1:
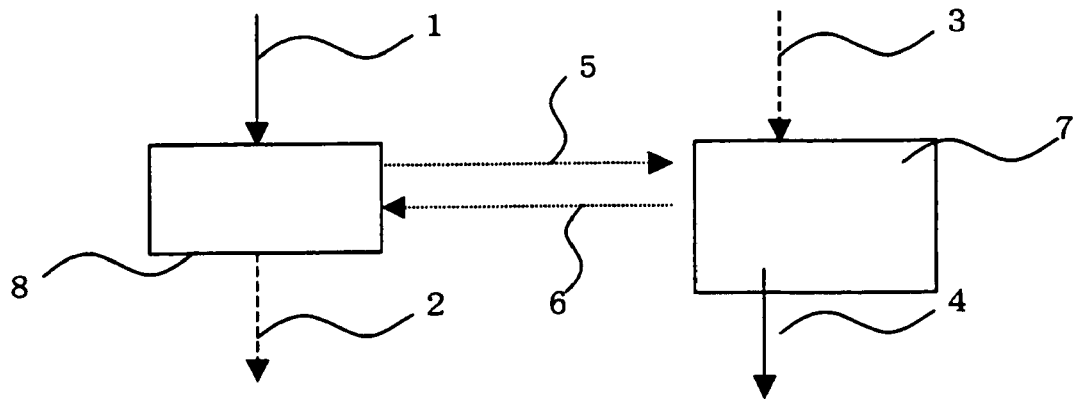
FIG. 1 outlines the solvent extraction process with TBP as an extractant for extracting the cuprous ion.

1 Extraction feed
2 Raffinate
3 Stripping (TBP regeneration) solution
4 TBP regeneration (stripping) liquor
5 Loaded TBP
6 Stripped (regenerated) TBP
7 Copper ion stripping step (TBP regeneration step)
8 Copper ion extraction step

DETAILED DESCRIPTIONS OF THE INVENTION

The process of solvent extraction of copper of the present invention is described in more detail.

The process of the present invention treats an aqueous chloride solution containing copper and one or more concomitant elements to recover copper by separating it from the concomitant elements, comprising a step for selective extraction of copper from the aqueous chloride solution by mixing the solution with an extractant of organic solvent composed of TBP as the major component after adjusting the solution at an oxidation-reduction potential of 0 to 350 mV based on an Ag/AgCl electrode (hereinafter referred as the "first step"), and another step for back extraction of copper by mixing the extractant in which copper is stripped with an aqueous solution (hereinafter referred as the "second step").

(1) First Step

The first step for the present invention is for selective extraction of copper from an aqueous chloride solution by mixing the solution with an extractant of organic solvent composed of TBP as the major component after adjusting the solution at an oxidation-reduction potential of 0 to 350 mV (based on an Ag/AgCl electrode).

The aqueous chloride solution containing copper and one or more concomitant elements to be treated in the first step is not limited. Some of the examples include a leach liquor containing copper and iron, silver or the like, discharged from an extractive metallurgy of non-ferrous metals or the like, solution for recovering copper and iron or the like from copper-plated ferrous materials, and solution for separating/recovering copper and precious metals, iron or the like from shredded parts of automobiles, home electric/electronic appliances or the like. Of these, particularly suitable solutions are those containing iron, silver or the like as the concomitant element.

The aqueous chloride solution is kept at an oxidation-reduction potential of 0 to 350 mV (based on an Ag/AgCl electrode) in the first step, preferably 200 to 300 mV, more preferably 250 to 300 mV. A leach liquor as an aqueous chloride solution discharged from an extractive metallurgy of non-ferrous metals or the like contains the cupric, ferrous and ferric ions, where the cupric ion is not extracted by a solvating extractant. However, the cupric and ferric ions are reduced into the cuprous and ferrous ions, respectively, in an aqueous solution kept at an oxidation-reduction potential of 0 to 350 mV (based on an Ag/AgCl electrode), and the cuprous ion is selectively extracted by a solvating extractant.

An oxidation-reduction potential beyond the above range is not desirable. At an oxidation-reduction potential above 350 mV, the copper ion becomes divalent and is not extracted by a solvating extractant. Moreover, the resulting cupric ion works as an oxidant to partly oxidize the iron ion into the trivalent state, and the resulting ferric ion is extracted by an extractant to deteriorate separation efficiency of the solvent extraction. At below 0 mV, on the other hand, the objective metallic ion, i.e., iron, copper or silver ion, may be reduced to the metallic state in some cases and precipitated.

The method for adjusting oxidation-reduction potential for the first step for the present invention is not limited, and may be selected from the known ones, e.g., addition of metallic copper or iron, which is baser than copper in an inert atmosphere, or a reducing agent, e.g., sulfur dioxide gas.

In the first step, the copper ion is extracted from an aqueous chloride solution of adjusted oxidation-reduction potential by mixing an extractant of organic solvent composed of TBP as the major component, where the cuprous ion in the solution is selectively extracted by TBP.

Silver in the solution is not extracted the least bit by TBP. Therefore, extracting copper in the solvent can separate copper from silver, and recover copper as the stripping liquor, and silver as the raffinate in the solvent extraction.

One industrial embodiment of the first step recycles, as required, the raffinate back to the extraction step, where it is mixed with a fresh extractant. This can extract copper into TBP essentially totally from the raffinate.

TBP as the major component in the extractant may be diluted with a diluent to keep fluidity. It should be noted, however, that extraction yield of the cuprous ion depends on concentrations of the chloride ion in the aqueous chloride solution and TBP in the extractant to be mixed with the solution. It is recommended to withhold dilution of the extractant as far as possible, accordingly. In order to secure an industrially desirable Cu/Fe separation coefficient, therefore, concentration of TBP in the extractant is kept preferably at 40 to 100% by volume, more preferably 50 to 100%. Copper and iron extraction can be also controlled by adjusting TBP concentration.

Concentration of TBP in the extractant also affects stripping of the cuprous ion (in the second step). Therefore, it is still more preferably kept at 80 to 90% by volume, particularly preferably 80 to 85%, in order to secure a high stripping yield. When it is kept at a level in the above range, the cuprous ion can be selectively separated and recovered into the extractant with TBP as the major component, and, at the same time, a high extraction yield can be secured even when the extractant discharged from the stripping step is recycled. In other words, concentration of TBP in the extractant is closely related to the problems involved in recycling of the extractant. This is described in detail by referring to the drawings.

FIG. 1 outlines the process flow of the solvent extraction process with TBP as an extractant to separate/recover the cuprous ion by extraction and stripping. When this process is used as part of a process of separation/recovery of copper from an aqueous chloride solution containing copper and iron, for example, the solution is adjusted at a desired oxidation-reduction potential, described above, to reduce copper and iron into the cuprous and ferrous ions beforehand.

First, the procedure of this process is outlined. Referring to FIG. 1, extraction feed 1, which is a starting liquor for the copper ion extraction step 8, is mixed with the stripped (regenerated) TBP 6, which contains little copper. Copper ion extraction step 8, which extracts the cuprous ion into TBP, produces loaded TBP 5, in which the copper ion is extracted, and raffinate 2. Subsequently, loaded TBP 5 is mixed with stripping (TBP regeneration) solution 3 of low copper ion, in the copper ion stripping (TBP regeneration) step 7. Copper ion stripping (TBP regeneration) step 7 separates and recovers the copper ion into the TBP regeneration (stripping) liquor 4 by removing a necessary quantity of the copper ion from loaded TBP 5. On the other hand the strip (regenerated) TBP liquor 6, is recycled back to the copper ion extraction step 8.

Next, the important points associated with concentration of TBP in the extractant and recycling of the regenerated TBP liquor are discussed.

Concentration of TBP in the extractant for the present invention, i.e., stripped (regenerated) TBP 6, is adjusted at 80 to 90% by volume, preferably 80 to 85%. The TBP concentration in the above range improves stripping yield, although deteriorating extraction yield to some extent. For example, it can improve a stripping yield to 50 to 70%, preferably 60 to 70%, while keeping an extraction yield of cuprous ion at around 40 to 55% in the once-through extraction process. At a TBP concentration below 80% by volume, extraction yield of cuprous ion in the copper ion extraction step 8 decreases to deteriorate efficiency.

At above 90% by volume of the TBP concentration, on the other hand, it is difficult to keep cuprous ion extraction rate at a high level, when the extractant is recycled. At the same time, separation of the solvent and aqueous phases from each other needs a longer time, because of increased viscosity of the extractant. In other words, increasing TBP concentration in the extractant generally accelerates extraction of the cuprous ion into the extractant in the copper ion extraction step 8 to increase its efficiency. At 90 to 100% by volume of the TBP concentration, for example, extraction yield of cuprous ion can be kept high at 55 to 80% in the once-through extraction process.

At above 90% by volume of the TBP concentration, complete stripping will be difficult by a simple regeneration procedure alone for the cuprous ion once extracted. For example, stripping will be 30 to 50%. Therefore, cuprous ion concentration cannot be kept at a high level in the TBP regeneration (stripping) liquor 4, while cuprous ion concentration increases in the stripped (regenerated) TBP 6.

Moreover, it will be difficult to secure an intended copper ion extraction rate in the copper ion extraction step 8, when the stripped (regenerated) TBP 6 is recycled, because concentration of copper in the loaded TBP 5 cannot be increased beyond a certain level in the copper ion extraction step 8. Therefore, it is necessary to make up additional TBP to secure a given extraction yield.

At the same time, the extractant increases in viscosity as its TBP concentration increases, deteriorating separatability between the solvent and aqueous phases. For example, the extractant has a viscosity of 3.0 mPa·s at a TBP concentration of 80% by volume, and exhibits a good separation efficiency. Its viscosity increases to 3.7 mPa·s at a concentration of 100% by volume. When the cuprous ion is extracted to a high concentration in TBP, in particular, viscosity of extractant greatly increases to cause problems, e.g., necessity for a special device to separate the solvent and aqueous phases from each other or greatly extended separation time, to deteriorate productivity.

The diluent for the extractant is not limited. Any organic solvent may be used, so long as it dose not greatly detract the TBP characteristics and is highly fluid (or low in viscosity). The preferable diluent are nonpolar organic solvents generally used as TBP diluents, in particular Class 2 petroleum products (kerosene and the like) and Class 3 petroleum products (dodecane and the like) as the hazardous materials designated by the Fire Defense Law, for their relatively mild dangerousness, high fluidity and handling easiness, among others.

(2) Second Step

The second step for the present invention is for stripping of the cuprous ion by mixing the extractant in which copper is stripped with an aqueous solution. This step may be repeated, as required, to increase stripping yield.

Concentration of copper in the aqueous solution for the second step is not limited, but is normally 0 to 70 g/L, preferably 0 to 30 g/L. The stripping solution contains no copper when it is fresh, but contains the copper ion when it is recycled. The upper limit of copper concentration of stripping solution is preferably 70 g/L or less, because copper may conversely move towards the solvent phase at a higher concentration.

Concentration of the chlorine ion in the aqueous solution for the second step is not limited, but is normally 50 to 350 g/L. The chlorine ion concentration is determined in accordance with the stripped copper concentration. In other words, the stripped cuprous ion has a low solubility in water, and the stripping solution should have a high chlorine ion concentration in accordance with a stripped copper concentration, in order to keep the stripped copper ion in a solution state. More specifically, it is necessary to adjust the chlorine ion concentration at least at 50, 150 and 200 g/L, when the cuprous ion concentration is expected to be at least 5, 50 and 80 g/L, respectively. The upper limit of the chlorine ion concentration is around 350 g/L for practical purposes, and it will be its upper limit.

The aqueous stripping solution may be incorporated with a chloride ion, e.g., hydrochloric acid or NaCl, to adjust its chlorine ion concentration.

The copper ion stripped into the aqueous solution is recovered as an aqueous solution containing monovalent $CuCl_2$. When the stripped copper ion is to be precipitated as the CuCl crystal, the chlorine ion concentration is not necessarily kept at a high level. However, it is preferably recovered in the state of solution by stripping, because when it is recovered in the state of solid, it is generally difficult to separate the solvent from the solid.

The stripping temperature is not limited, but is normally 20 to 90° C., preferably 40 to 90° C. The stripping operating at 20° C. or higher transfers a larger quantity of the copper ion from TBP to the aqueous phase to increase stripping yield. At above 90° C., on the other hand, heat is more lost by radiation, making it difficult to keep a desired temperature for the stripping. Moreover, stripping at such a high temperature is not practical because of a larger loss of the solvent by evaporation, and difficulty in keeping the solvent and aqueous phases stable.

EXAMPLES

The present invention is described in more detail by EXAMPLES for the present invention and COMPARATIVE EXAMPLE. However, it should be understood that the present invention is by no means limited by EXAMPLES. In EXAMPLES and COMPARATIVE EXAMPLE, copper was analyzed by ICP emission spectrometery.

Example 1

(1) First Step

An aqueous solution containing cupric (divalent) chloride and ferric (trivalent) chloride was prepared to have a copper concentration of 50 g/L and iron concentration of 70 g/L as the extraction feed. The solution was then incorporated with common salt to have a chlorine ion concentration of 200 g/L. It was heated at 60° C., and incorporated with iron powder to adjust its oxidation-reduction potential at 275 mV (based on an Ag/AgCl electrode). The solution of adjusted oxidation-reduction potential was mixed with a TBP liquor at room temperature to extract the metallic ions therein to determine copper and iron extraction yields. The mixing was carried out in an inert gas atmosphere with nitrogen to prevent oxidation which could result from vapor-liquid contact at the interface.

Figure 2:
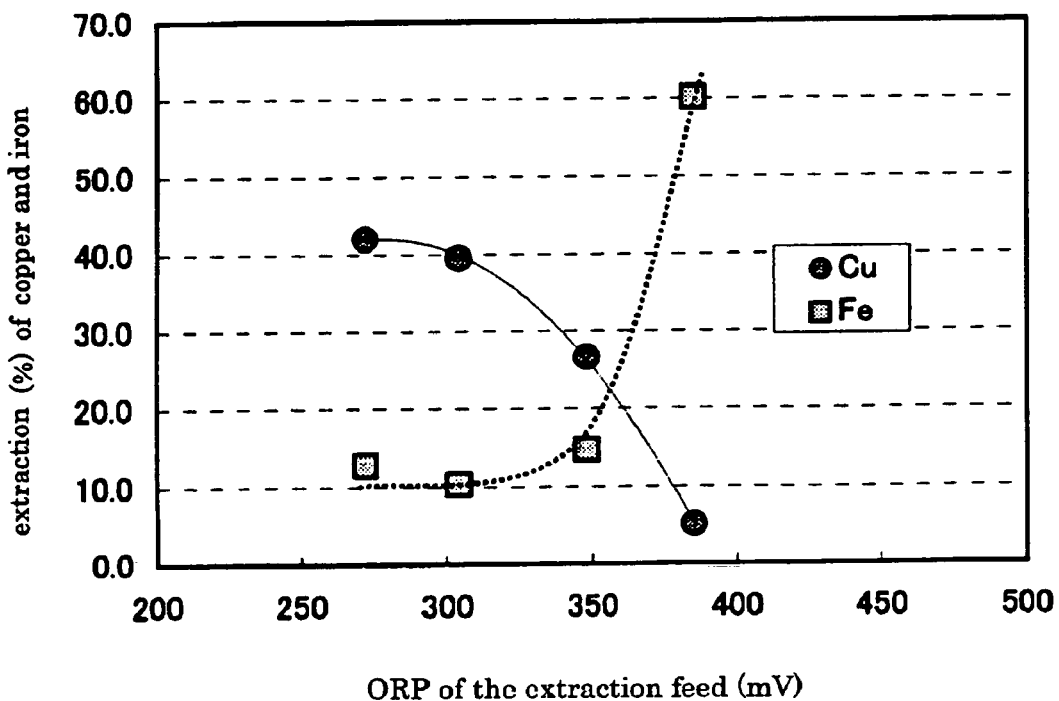
FIG. 2 shows the results produced in the first step in EXAMPLES 1 and 2 and COMPARATIVE EXAMPLE 1, plotting extraction yields of copper and iron against oxidation-reduction potential (ORP) of the aqueous chloride solution.
Figure 3:
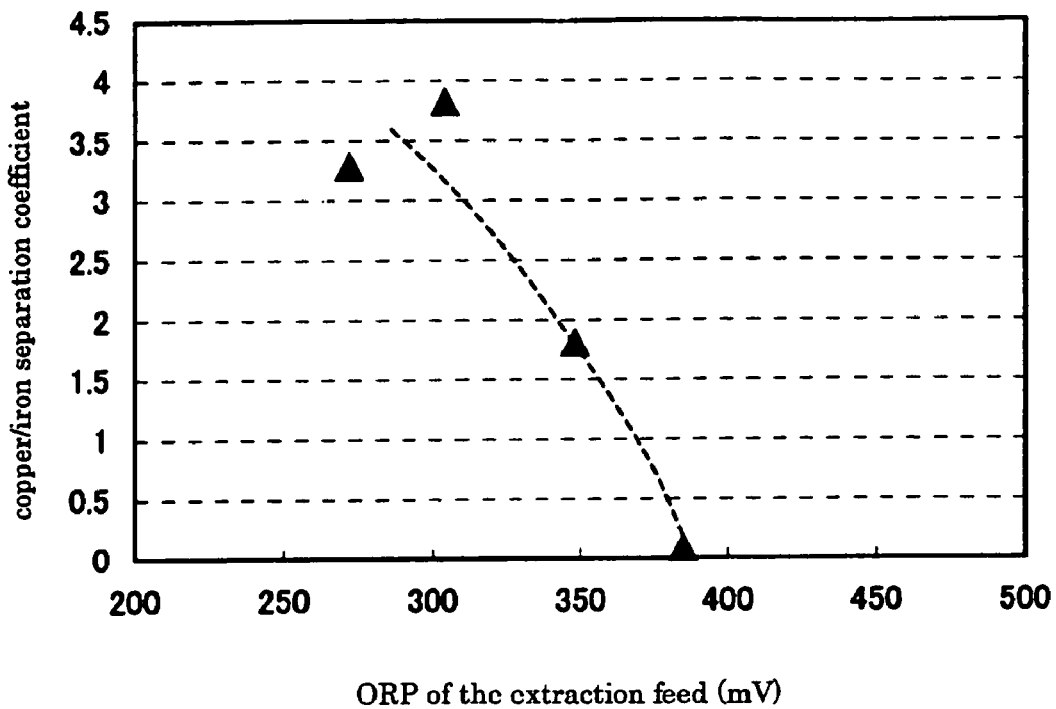
FIG. 3 shows the results produced in the first step in EXAMPLES 1 and 2 and COMPARATIVE EXAMPLE 1, plotting copper/iron separation coefficient against oxidation-reduction potential (ORP) of the aqueous chloride solution.

FIG. 2 plots the results of copper and iron extraction yields against oxidation-reduction potential (based on an Ag/AgCl electrode). FIG. 3 plots the Cu/Fe separation coefficient, determined from the above results, also against oxidation-reduction potential. The Cu/Fe separation coefficient is ratio of the copper/iron concentration ratio of the extraction raffinate to that of the extraction feed, and a higher separation coefficient means that copper is extracted and distributed at a higher concentration relative to iron.

(2) Second Step

Figure 6:
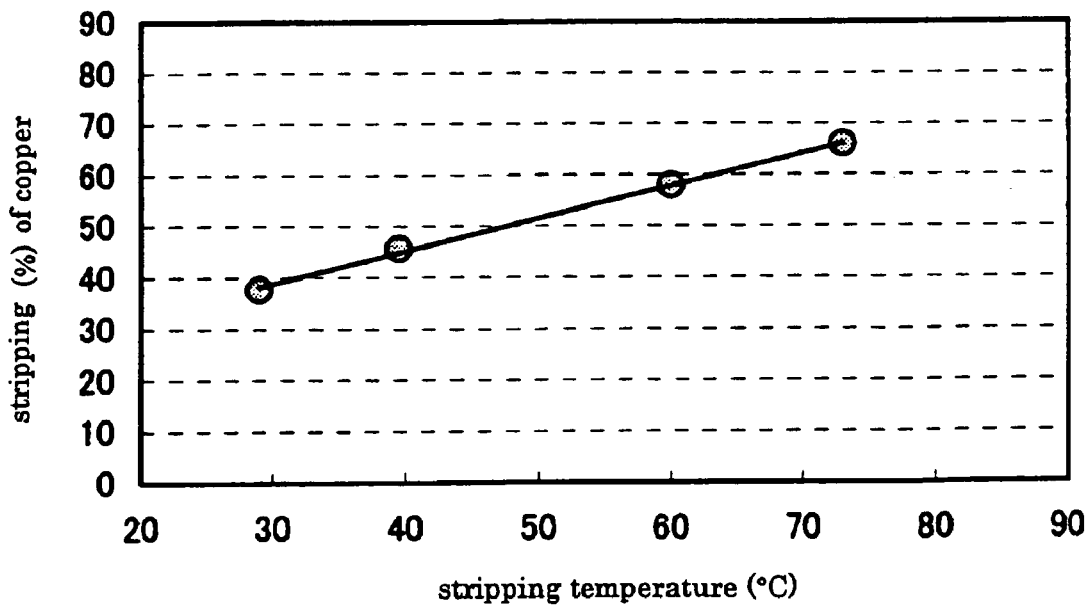
FIG. 6 shows the results produced in the second step in EXAMPLE 1, plotting yield of copper stripped from TBP against stripping temperature.

The loaded extractant which used for the first step was stripped to recover copper therefrom in the second step with a stripping solution adjusted at a pH of 0.5 with hydrochloric acid and a chlorine ion concentration of 100 g/L with NaCl at 30, 40, 60 or 75° C., to determine stripping yield at each temperature level. The results are given in FIG. 6. As shown, stripping yield increases as temperature increases, and stripping temperature of 50° C. or higher is preferable to strip copper at 50% or more from the loaded extractant.

Example 2

Example 2 was carried out in the same manner as in EXAMPLE 1, except that the extraction feed was adjusted at an oxidation-reduction potential of 300 or 350 mV, to determine copper and iron extraction yields and copper/iron separation coefficient. The results are given in FIGS. 2 and 3.

Decreasing oxidation-reduction potential from 300 or 350 mV (EXAMPLE 2) to 275 mV (EXAMPLE 1), improved greatly extraction yield of the copper, but extraction yield of the iron ion decrease, as shown in FIG. 2. At the same time, decreasing oxidation-reduction potential from 300 or 350 mV (EXAMPLE 2) to 275 mV (EXAMPLE 1) increases copper/iron separation coefficient, by which is meant that copper is extracted more selectively over iron, as shown in FIG. 3.

Example 3

Example 3 was carried out in the same manner as in EXAMPLE 1, except that a synthesized aqueous solution containing copper at 80 g/L and iron at 50 g/L was used as the extraction feed, where the solution was adjusted at an oxidation-reduction potential of 300 mV, and that diluted solvent with kerosene to have a TBP concentration of 40, 60, 80 or 100% (no dilution) by volume was used, to determine copper and iron extraction yields and copper/iron separation coefficient. The results are given in FIGS. 4 and 5.

Figure 4:
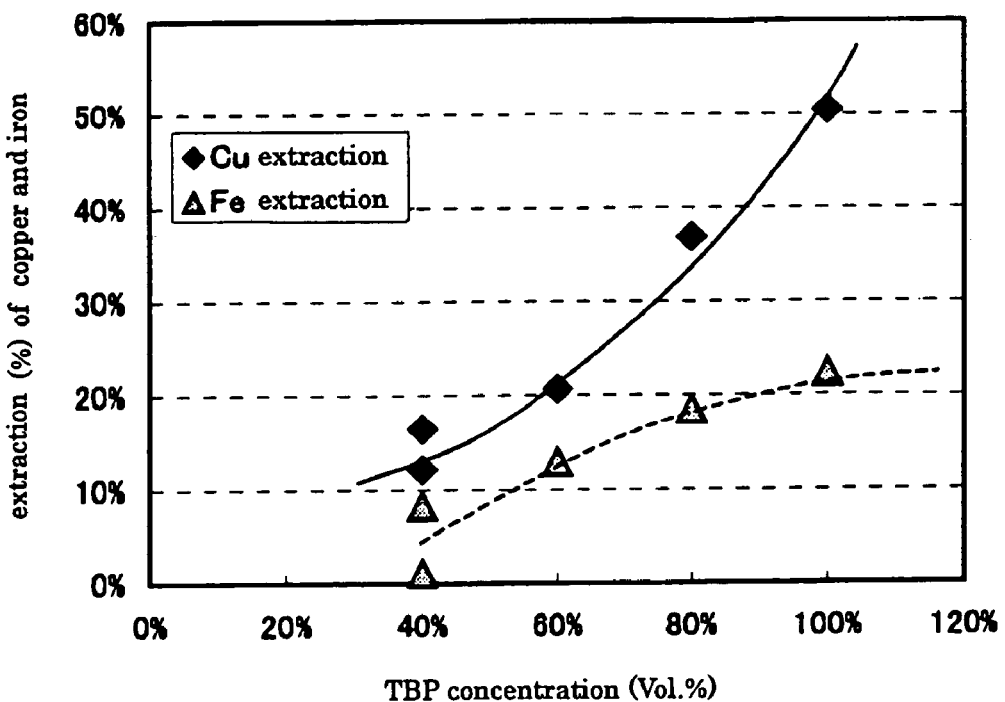
FIG. 4 shows the results produced in EXAMPLE 3, plotting extraction yields of copper and iron against TBP concentration.
Figure 5:
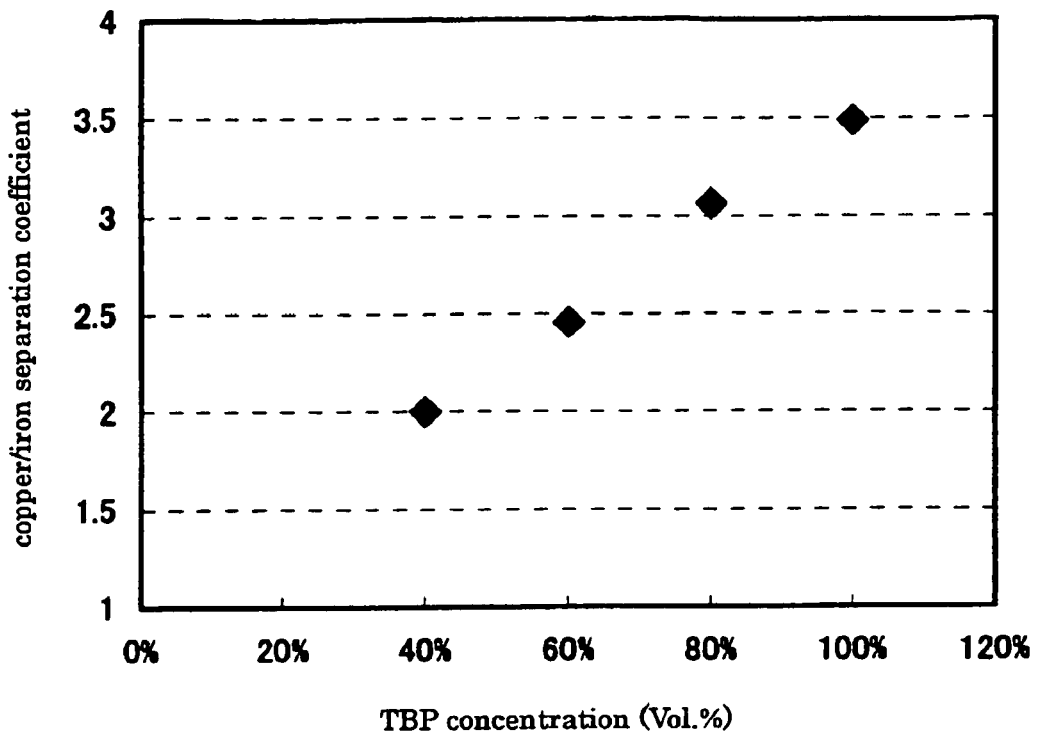
FIG. 5 shows the results produced in EXAMPLE 3, plotting copper/iron separation coefficient against TBP concentration.

Increasing TBP concentration increases copper extraction yield, but does not change iron extraction yield significantly, as shown in FIG. 4. It is also found that increasing TBP concentration increases copper/iron separation coefficient as shown in FIG. 5.

Example 4

A leach liquor of copper concentrate containing cupric (divalent) chloride, ferric (trivalent) chloride and silver (monovalent) chloride was prepared to have a copper, iron and silver concentrations of 118 g/L, 90 g/L and 9 mg/L, respectively. It was heated at 60° C., and incorporated with iron powder to adjust its oxidation-reduction potential at 300 mV.

Next, the liquor of adjusted oxidation-reduction potential was mixed with a TBP liquor as an extractant at room temperature to extract the metallic ions therein.

Then, the loaded extractant was stripped to recover the copper ion therefrom with a stripping solution adjusted at a pH of 1.0 with hydrochloric acid and a chlorine ion concentration of 50 g/L with NaCl at 50° C. The raffinate contained copper, iron and silver at 60 g/L, 90 g/L and 8 mg/L, and the stripping liquor contained copper, iron and silver at 28 g/L, 5 g/L and 1 mg/L or less. Silver was little extracted by TBP to remain in the raffinate, and copper and silver were separated from each other almost completely.

Example 5

The leach liquor which was discharged from the step for leaching a copper concentrate with chlorine in an extractive metallurgy of non-ferrous metal was used as an extraction feed. It contained copper, iron, silver and the chlorine ion at 118 g/L, 90 g/L, 9 mg/L and 200 g/L. 1 L of the liquor was fed in a beaker as an extraction feed. It was heated at 60° C. and incorporated with iron powder to adjust its oxidation-reduction potential at 300 mV (based on an Ag/AgCl electrode). Then the solvent extraction was carried out, where the liquor was mixed with 2 L of TBP (100% TBP extractant) at room temperature for 10 minutes with stirring by a stirrer in an inert gas atmosphere with nitrogen to prevent oxidation which could result from vapor-liquid contact at the interface. The mixed liquor was separated into the organic and aqueous phases, and the aqueous phase (raffinate) was analyzed to determine yields of copper and iron extracted into the organic phase (TBP). The aqueous phase (raffinate) contained copper, iron and silver at 60 g/L, 90 g/L and 8 mg/L. Extraction yield of copper and iron were 59.6 and 11.6%, respectively. Thus, copper was selectively extracted relative to iron. Silver was found to mostly remain in the aqueous phase (raffinate).

Next, the organic phase (TBP) was stripped with 1 L of a stripping solution adjusted at a pH of 0.5 with hydrochloric acid and a chlorine ion concentration of 50 g/L with NaCl, where they were mixed with each other for 2 minutes at 60° C. Then, the mixed liquor was separated into the organic and aqueous phases, and the aqueous phase (stripping liquor) was analyzed to determine yield of copper stripped from the organic phase into the aqueous phase. The aqueous phase (stripping liquor) contained copper, iron and silver at 28 g/L, 5 g/L and 1 mg/L or less. A stripping yield of copper was 58%.

Example 6

The extraction feed, extractant and stripping solution prepared by the following procedures were used.
(1) Extraction feed: the extraction feed adjusted at a pH of 1.0 with hydrochloric acid and oxidation-reduction potential of 300 mV or less (based on an Ag/AgCl electrode) with metallic copper. It contained the ferrous, cuprous ion and chlorine ions at 100, 40 and 200 g/L.
(2) Extractant: TBP was diluted with SHELLSOL A™ (a hydrocarbon-based, nonpolar detergent equivalent to kerosene, Showa Shell) to adjust TBP concentration of the extractant.
(3) Stripping solution: the stripping solution was adjusted at a pH of 1.0 with hydrochloric acid. It contained the chlorine ion at 100 g/L.

First, 300 mL of the extractant, adjusted to have a TBP concentration of 80% by volume, was mixed with 300 mL of the extraction feed for 10 minutes with stirring by a stirrer in a beaker kept at 40° C., to determine extraction yield of copper ion (ratio of the copper ion transferred into the extractant). The result is given in FIG. 7.

Next, 40 mL of the loaded extractant in which the metals were extracted in the above procedure was mixed with 40 mL of the stripping solution for 10 minutes with stirring by a stirrer in a beaker kept at 60° C., to determine stripping yield of copper ion (ratio of the copper ion transferred into stripping solution). The result is given in FIG. 8. FIG. 9 shows viscosity of the extractant at 24° C.

Example 7

Extraction and stripping were carried out in the same manner as in EXAMPLE 6, except that concentration of TBP in the extractant was set at 90% by volume, to determine extraction yield of copper ion, stripping yield of copper ion and viscosity of the extractant. The results are given in FIGS. 7, 8 and 9, respectively.

Example 8

Extraction and stripping were carried out in the same manner as in EXAMPLE 6, except that concentration of TBP in the extractant was set at 70% by volume, to determine extraction yield of copper ion, stripping yield of copper ion and viscosity of the extractant. The results are given in FIGS. 7, 8 and 9, respectively.

Example 9

Extraction and stripping were carried out in the same manner as in EXAMPLE 6, except that concentration of TBP in the extractant was set at 100% by volume, to determine extraction yield of copper ion, stripping yield of copper ion and viscosity of the extractant. The results are given in FIGS. 7, 8 and 9, respectively.

Figure 7:
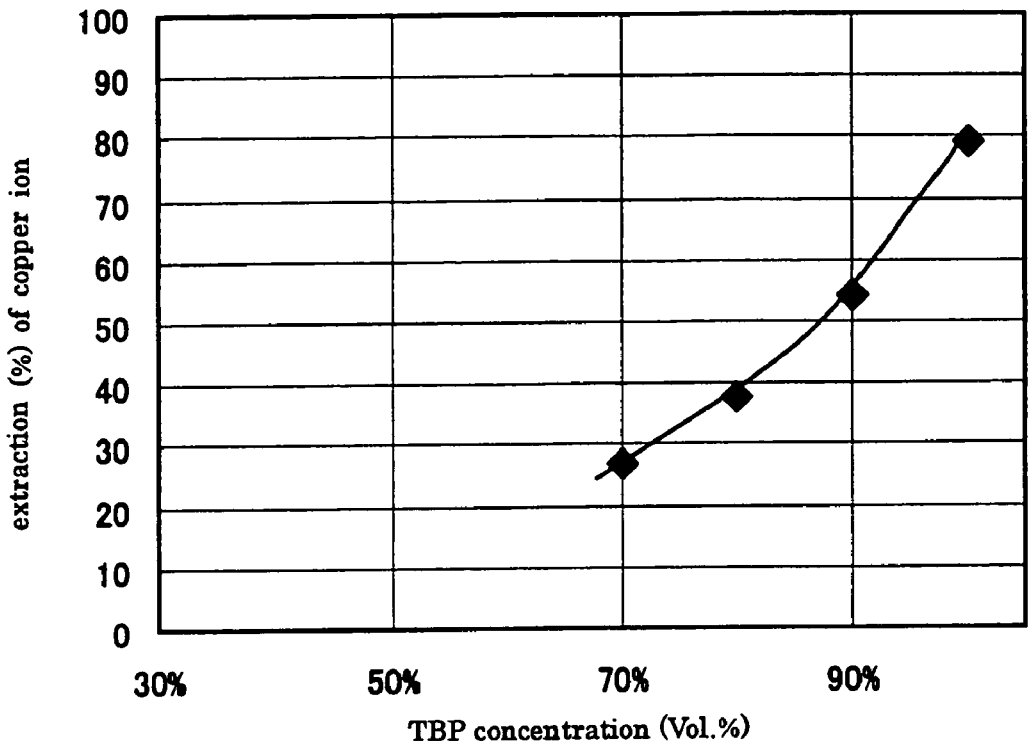
FIG. 7 shows the relationship between extraction yield of copper ion and TBP concentration as the results produced in EXAMPLES 6 to 9.
Figure 8:
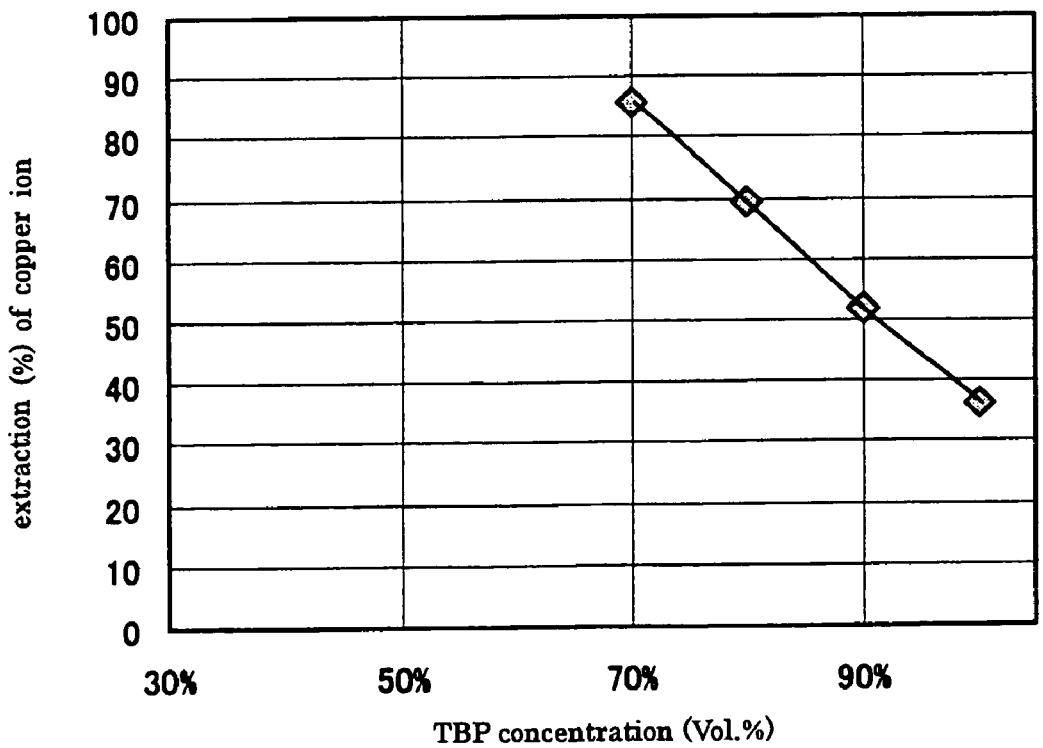
FIG. 8 shows the relationship between stripping yield of copper ion and TBP concentration as the results produced in EXAMPLES 6 to 9.
Figure 9:
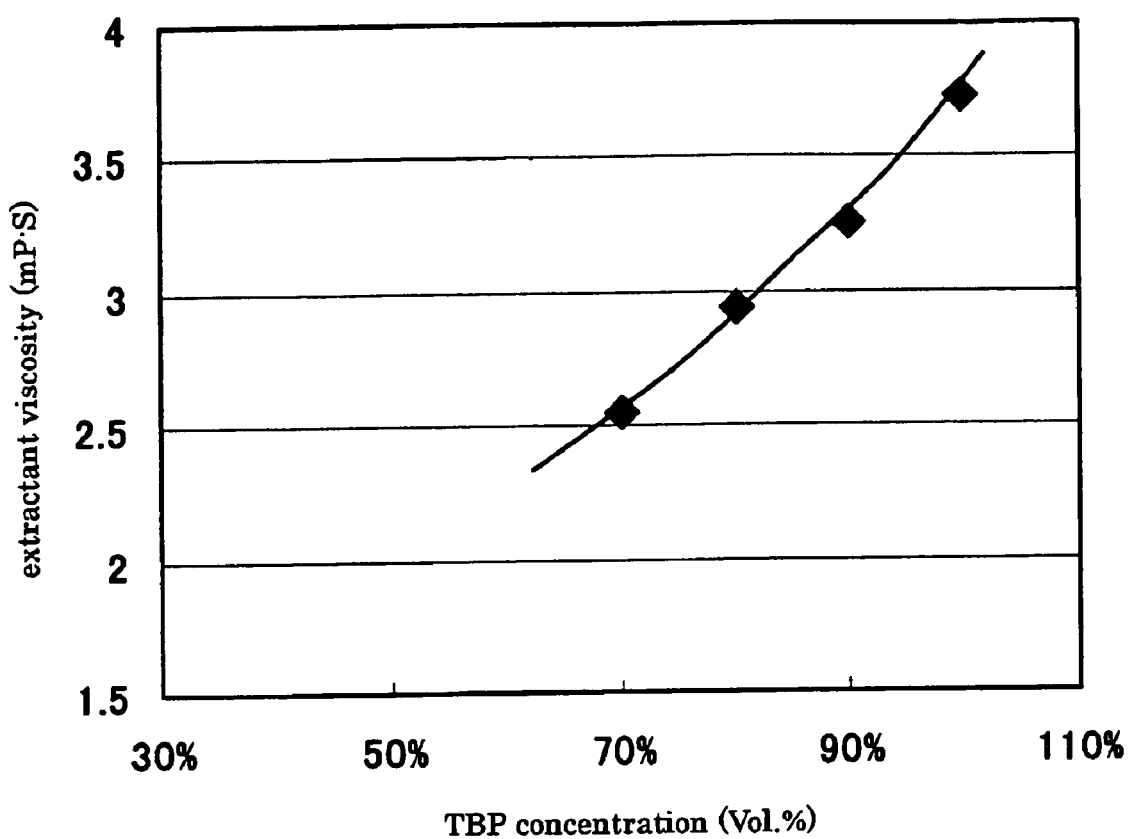
FIG. 9 shows the relationship between extractant viscosity and TBP concentration as the results produced in EXAMPLES 6 to 9.

It is found, as shown in FIGS. 7 to 9 which present the results produced in EXAMPLES 6 to 9, that extraction yield of copper ion increases as TBP concentration increases in the extraction step, stripping yield if copper ion decreases as TBP concentration increases in the stripping step, and viscosity increases as TBP concentration increases.

At a TBP concentration of 80% by volume (EXAMPLE 6), the extraction and stripping yields are around 40% and 70% or more, respectively. This means that quantity of the cuprous ion transferred from the extraction feed to the stripping liquor (extraction yield×stripping yield) is around 28% on the extraction feed. In this case, concentration of the copper ion in the stripped extractant is 3 g/L at the lowest, and that in the raffinate is 2 g/L at the lowest, when the stripped extractant is recycled to the extraction step.

At a TBP concentration of 90% by volume (EXAMPLE 7), the extraction yield is around 55%, but stripping yield is 52% when the loaded extract is stripped. This means that quantity of the copper ion transferred from the extraction feed to the stripping liquor is around 28% on the extraction feed. In this case, concentration of the copper ion in the stripped extractant is 6 g/L at the lowest, and that in the raffinate is 2 g/L at the lowest, when the stripped extractant is recycled to the extraction step.

At a TBP concentration of 70% by volume (EXAMPLE 8), the extraction and stripping yields are around 25 and 85%, respectively. This means that quantity of the copper ion transferred from the extraction feed to the stripping liquor is around 22% or less on the extraction feed.

At a TBP concentration of 100% by volume (EXAMPLE 9), the extraction yield is around 80%, but stripping yield is only 35%. This means that quantity of the copper ion transferred from the extraction feed to the stripping liquor is around 28% on the extraction feed. The stripped extractant has an extraction capacity decreased to 35% of that of the fresh extractant, when it is recycled back to the extraction step. In this case, concentration of the copper ion in the stripped extractant is 15 g/L at the lowest, and that in the raffinate is 3 g/L at the lowest, when the stripped extractant is recycled to the extraction step.

Comparative Example 1

Extraction and stripping were carried out in the same manner as in EXAMPLE 1, except that the extraction feed was adjusted at an oxidation-reduction potential of 380 mV (based on an Ag/AgCl electrode), to determine extraction yields of copper and iron and copper/iron separation coefficient. The results are given in FIGS. 2 and 3.

It is found that the copper ion is little extracted by a extraction feed adjusted at an oxidation-reduction potential of 380 mV (FIG. 2), and that the copper/iron separation coefficient is 1 or less (FIG. 3), by which is meant that selective selection cannot be expected.

It is apparent, as discussed above, that the process of solvent extraction of copper of the present invention can be used in a hydrometallurgical process area for separation/recovery of valuable metals, e.g., copper and iron, from an aqueous chloride solution. It is particularly useful for production of an electrolysis feed which contains the cuprous ion.

What is claimed is:

1. A process of solvent extraction of copper which treats an aqueous chloride solution containing copper and iron as a concomitant element to separate/recover copper, comprising:
the first step for selective extraction of copper from the aqueous chloride solution by mixing the solution with an extractant of organic solvent composed of tributyl phosphate at 40% by volume or more after adjusting the solution at an oxidation-reduction potential of 0 to 350 mV (based on an Ag/AgCl electrode), and
the second step for stripping of copper by mixing the extractant in which copper is stripped with an aqueous solution containing copper at 70 g/L or less and chlorine ion at 50 to 350 g/L.

2. The process according to claim 1, wherein the aqueous chloride solution for the first step is kept at an oxidation-reduction potential of 250 to 300 mV (based on an Ag/AgCl electrode).

3. The process according to claim 1, wherein the extractant for the first step contains tributyl phosphate at 80 to 90% by volume.

4. The process according to claim 1, wherein the stripping is carried out at 20 to 90° C. in the second step.

5. The process according to claim 1, wherein the aqueous chloride solution further contains silver as another concomitant element.

6. The process according to claim 2, wherein the aqueous chloride solution further contains silver as another concomitant element.

7. The process according to claim 3, wherein the aqueous chloride solution further contains silver as another concomitant element.

8. The process according to claim 4, wherein the aqueous chloride solution further contains silver as another concomitant element.

* * * * *